June 9, 1959  R. H. BRONLEEWE  2,889,890
LIFTHITCH FOR SPRING TOOTH HARROWS
Filed July 9, 1956  2 Sheets-Sheet 1
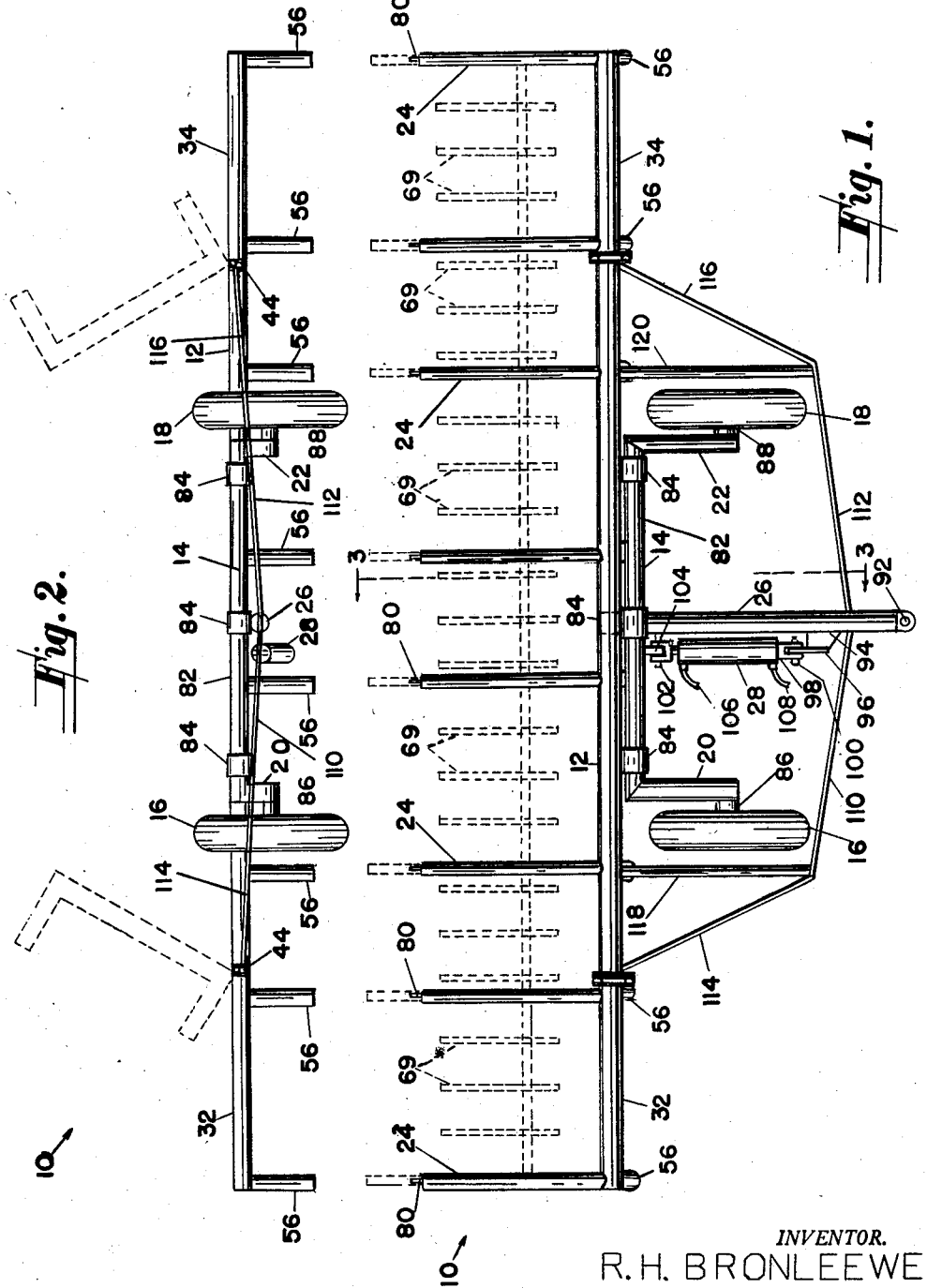
INVENTOR.
R. H. BRONLEEWE
BY Arthur H. Sturges.
Attorney

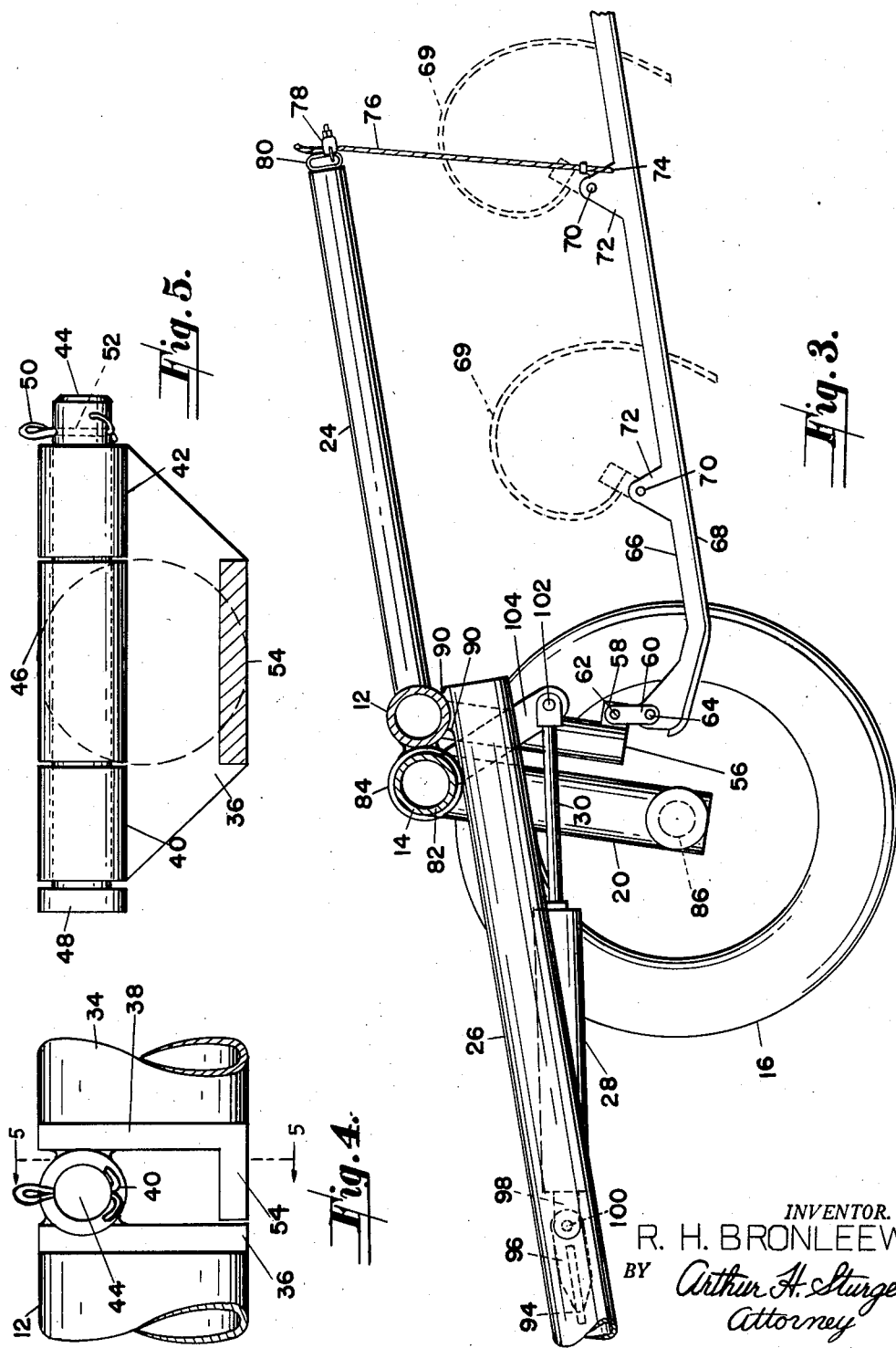

2,889,890
LIFTHITCH FOR SPRING TOOTH HARROWS

Robert H. Bronleewe, near Geneseo, Kans.

Application July 9, 1956, Serial No. 596,718

1 Claim. (Cl. 172—413)

This invention relates to agricultural implements and particularly cultivating devices and machines, and in particular an attachment for a spring tooth harrow whereby the harrow is elevated by a hydraulic cylinder for removing trash from the teeth and to facilitate transportation.

The purpose of this invention is to provide means in a spring tooth harrow whereby an operator of a tractor towing the harrow may elevate the harrow from his position on the seat of the tractor.

Harrows, being of comparatively heavy construction, and relatively wide, are difficult to move from one field to another and are also difficult to transport on highways and store in barns and the like. Furthermore, because of the weight, such machines are difficult to elevate to permit the removal of trash and the like from the teeth. With this thought in mind this invention contemplates a spring tooth harrow having an elongated beam with hinged end sections, and in which wheels carried by crank arms pivotally mounted on the beam are actuated by a hydraulic cylinder to elevate and lower the harrow.

The object of this invention is, therefore, to provide a spring tooth harrow with an elevating attachment whereby the harrow may be elevated for removing trash from the teeth thereof, and also for transportation.

Another object of the invention is to provide a spring tooth harrow having folding sections to facilitate transporting the harrow through gates and the like, and also to facilitate storage thereof.

Another important object of the invention is to provide means for incorporating a hydraulic cylinder in a spring tooth harrow whereby the harrow may be elevated and lowered from the operator's seat of a towing tractor.

It is yet another object of the invention to provide a spring tooth harrow having elevating means therein in which hinged sections on the ends of the harrow make it possible to cover greater areas with each passage of the harrow across a field and at the same time transport the harrow through gates and the like.

A further object of the invention is to provide a spring tooth harrow having collapsible sections and elevating means incorporated therein in which the parts are adapted to be operated by a single operator.

A still further object of the invention is to provide a spring tooth harrow having folding sections and elevating means therein in which the harrow is of a simple and economical construction.

With these and other objects and advantages in view the invention embodies a spring tooth harrow having hinged end sections with spaced arms extended over the tooth carrying rails, and with a hydraulic cylinder positioned in the harrow and mounted to elevate the said rails with the spring teeth thereon.

Other features and advantages of the invention will appear from the following description taken in connection with the drawings, wherein:

Figure 1 is a plan view of the improved spring tooth harrow showing hinged sections at the ends, wheels carried by crank arms pivotally mounted on the harrow, and a hydraulic cylinder for actuating the crank arms and wheels to elevate the harrow.

Figure 2 is a front elevational view of the attachment with the harrow elements omitted and showing, in particular, hinged sections at the ends of the harrow in folded positions in dotted lines.

Figure 3 is a cross section through the harrow, taken on line 3—3 of Figure 1, with the parts shown on an enlarged scale and with the spring teeth shown in dotted lines.

Figure 4 is an elevational view with the parts on an enlarged scale showing one of the hinge assemblies for connecting the folding sections of the harrow to the center section thereof.

Figure 5 is a cross section through the hinge taken on line 5—5 of Figure 4.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claim. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 an elongated tubular transverse beam, numeral 14 an inverted U-shaped tubular bar or frame having wheels 16 and 18 on the lower ends of crank arms 20 and 22, numeral 24 spaced arms extended from the beam, numeral 26 a tongue extended forwardly from the beam, and numeral 28 a hydraulic cylinder mounted on the tongue and having a piston rod 30 extended from one end and pivotally connected to a lever extended from the U-shaped frame 14.

The beam 12 is provided with end sections 32 and 34 which are pivotally connected to the center section with hinges, as illustrated in Figure 4. The hinges include end or butt plates 36 secured, such as by welding, to the ends of the center section, and hinge plates 38 also secured, such as by welding, to the inner ends of the end sections 32 and 34. The ends of the plates 36 extend outwardly, as shown in Figure 5, and the upper edges are provided with hubs 40 and 42 through which pins 44 extend. The upper edges of the hinge plates 38 are also provided with hubs 46 that are aligned with and that also mesh with the hubs 40 and 42, whereby the pins 44 also extend through the hubs 46. One of the ends of the pins 44 are provided with heads 48 and the opposite ends are provided with cotter pins 50 that extend through openings 52 in the pins. The hinge plates 38 are also provided with stop sections 54 which are positioned to engage lower edges of the butt plates 36. With the parts mounted in this manner the end sections 32 and 34 are readily folded to the dotted line positions shown in Figure 2, and when it is desired to use the end sections they are dropped downwardly to the positions shown in full lines in Figure 2 wherein the stop sections 54 abut the butt plates 36 which retain the end sections in horizontally disposed positions.

The beam 12 and also the end sections 32 and 34 are provided with depending struts 56 on the lower ends of which lugs 58 are provided and, as shown in Figure 3, links 60 which are pivotally connected to the lugs with pins 62 are also pivotally connected by pins 64 to rails 66 on the lower edges of which shoes 68 are provided. Spring teeth, as indicated by the dotted lines 69, are pivotally connected by pins 70 to lugs 72 on the rails and the outer lugs are provided with openings 74 through which ends of cables 76 extend and in which the ends of the cables are secured, and the upper ends of the cables are secured by clamps 78 to rings 80 on the extended ends of the arms 24.

The horizontal section 82 of the inverted U-shaped bar 14 is pivotally mounted on the center section of the beam 12 with bearings 84, and the wheels are rotatably mounted on the extended ends of the crank arms 20 and 22 with axles 86 and 88.

The tongue 26 is secured to the beam 12, such as by welding, as shown at the points 90, and the extended end of the tongue is provided with a hitch 92.

The extended end of the tongue is also provided with a bracket 94 having a bar 96 to which a U-shaped member 98 on the end of the hydraulic cylinder 28 is pivotally connected by a pin 100. The piston rod 30, which extends from a piston in the cylinder through the end thereof opposite to the end on which the member 98 is positioned, is pivotally connected by a pin 102 to the end of the lever 104 which extends from the U-shaped bar 14. The cylinder 28 is provided with hose connections 106 and 108 so that pressure may be applied to either end of the cylinder to elevate or lower the harrow.

The tongue is supported by a forwardly extended frame including inclined bars 110 and 112 with braces 114 and 116 extended from ends of the bars to the beam 12, and with struts 118 and 120 also extended from the ends of the bars 110 and 112 to the beam 12, as shown in Figure 1. The inner ends of the bars 110 and 112 are connected to the tongue 26 by welding or the like.

*Operation*

With the parts assembled as illustrated and described an operator on a towing tractor connected to the hitch 92 and with the hose connections 106 and 108 connected to the hydraulic system of the tractor may, by applying pressure to one end of the cylinder, elevate the harrow with the spring teeth thereon to the position shown in Figure 3, or by applying pressure to the opposite end of the cylinder, lower the harrow until the shoes 68 ride upon the ground; and when it is desired to transport the harrow through a gate or the like the end sections are folded to the positions shown in dotted lines in Figure 2.

When in field operation the cables 76 are slacked about four inches, allowing the harrow to follow the ground on its runners, and in extremely soft ground the forward ends of the runners can be elevated slightly for easier drafts.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent is:

In a harrow, the combination which comprises an elongated transversely disposed tubular beam, vertically disposed butt plates having horizontally positioned hubs on outer surfaces welded in the ends of the tubular beam, tubular end sections aligned with and extended from ends of the tubular beam, hinge plates having hinge hubs on upper parts of outer surfaces thereof and stop sections extended from lower parts thereof welded in inner ends of the tubular end sections, pins extended through the hubs of the butt and hinge plates providing hinges, spaced horizontally disposed longitudinally positioned arms extended rearwardly from the tubular beam and end sections thereof, spaced vertically disposed struts depending from the tubular beam and end sections thereof for supporting the harrow in spaced relation to the ground, spaced longitudinally disposed rails pivotally mounted on lower ends of the struts, cables depending from extended ends of the arms and attached to the rails for retaining the rails in spaced relation to the ground, harrow teeth carried by said rails, a U-shaped frame having arms extended from ends of a center portion, bearings carried by the tubular beam and in which the center portion of the U-shaped frame is pivotally mounted, wheels rotatably mounted on ends of the arms of the U-shaped frame, a tongue extended forwardly from the tubular beam, spaced longitudinally disposed struts extended forwardly from the tubular beam, braces connecting ends of the tubular beam and struts, and a hydraulic cylinder pivotally mounted on the tongue and positioned with the piston rod thereof pivotally connected to an arm depending from the center portion of the U-shaped frame whereby the application of fluid under pressure to the end of the cylinder pivotally connected to the tongue drives the arms with the wheels thereon downwardly elevating the harrow frame and teeth.

References Cited in the file of this patent
UNITED STATES PATENTS

| | | |
|---|---|---|
| 2,082,163 | Jeoffroy | June 1, 1937 |
| 2,599,251 | Garrett | June 3, 1952 |
| 2,750,724 | Stephenson | June 19, 1956 |
| 2,800,758 | Schmied | July 30, 1957 |

FOREIGN PATENTS

| | | |
|---|---|---|
| 140,455 | Sweden | May 19, 1953 |